United States Patent
Takimoto

(10) Patent No.: US 10,321,091 B2
(45) Date of Patent: Jun. 11, 2019

(54) INFORMATION PROCESSING DEVICE AND METHOD OF INFORMATION PROCESSING

(71) Applicant: SONY CORPORATION, Tokyo (JP)

(72) Inventor: Yuuji Takimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/529,584

(22) PCT Filed: Nov. 24, 2015

(86) PCT No.: PCT/JP2015/082904
§ 371 (c)(1),
(2) Date: May 25, 2017

(87) PCT Pub. No.: WO2016/088602
PCT Pub. Date: Jun. 9, 2016

(65) Prior Publication Data
US 2017/0324926 A1    Nov. 9, 2017

(30) Foreign Application Priority Data
Dec. 2, 2014    (JP) ................ 2014-244440

(51) Int. Cl.
*H04N 5/92* (2006.01)
*G06F 3/16* (2006.01)
(Continued)

(52) U.S. Cl.
CPC ............. *H04N 5/9202* (2013.01); *G06F 3/16* (2013.01); *H04N 1/32112* (2013.01);
(Continued)

(58) Field of Classification Search
CPC .................................................. H04N 5/9202
(Continued)

(56) References Cited

U.S. PATENT DOCUMENTS

| 7,277,125 B2 * | 10/2007 | Nishimura | ............ G06T 1/0007 345/630 |
| 2005/0000546 A1 * | 1/2005 | Davis | ........................ B08B 9/04 134/22.12 |
| 2008/0145032 A1 * | 6/2008 | Lindroos | ................ H04N 7/163 386/338 |

FOREIGN PATENT DOCUMENTS

| JP | 2004-260247 A | 9/2004 |
| JP | 2011-120306 A | 6/2011 |
| JP | 2014-38429 A | 2/2014 |

OTHER PUBLICATIONS

International Search Report and Written Opinion of PCT Application No. PCT/JP2015/082904, dated Jan. 19, 2016, 01 pages of English Translation and 07 pages of ISRWO.

\* cited by examiner

*Primary Examiner* — Joel W Fosselman
(74) *Attorney, Agent, or Firm* — Chip Law Group

(57) ABSTRACT

Provided is an information processing device according to the present disclosure including a photographing information acquisition unit configured to acquire photographing information, which indicates photographing being performed in another device, from the other device, and a function activation unit configured to activate a function related to a photographed image depending on the acquisition of the photographing information. In particular, the function is a function of recording a voice uttered by a user with respect to photographing corresponding to the photographing information. This configuration makes it possible for a separate device to give a comment by voice to a picture photographed by the other device.

20 Claims, 4 Drawing Sheets

(51) Int. Cl.
  *H04N 5/232* (2006.01)
  *H04N 5/77* (2006.01)
  *H04N 1/32* (2006.01)

(52) U.S. Cl.
  CPC ..... *H04N 5/23206* (2013.01); *H04N 5/23245* (2013.01); *H04N 5/77* (2013.01); *H04N 2201/3264* (2013.01); *H04N 2201/3273* (2013.01); *H04N 2201/3277* (2013.01)

(58) Field of Classification Search
  USPC .................................................. 348/231.4
  See application file for complete search history.

INFORMATION PROCESSING DEVICE AND METHOD OF INFORMATION PROCESSING

CROSS REFERENCE TO RELATED APPLICATIONS

This application is a U.S. National Phase of International Patent Application No. PCT/JP2015/082904 filed on Nov. 24, 2015, which claims priority benefit of Japanese Patent Application No. JP 2014-244440 filed in the Japan Patent Office on Dec. 2, 2014. Each of the above-referenced applications is hereby incorporated herein by reference in its entirety.

TECHNICAL FIELD

The present disclosure relates to an information processing device, a method of information processing, and a program.

BACKGROUND ART

Approaches to attach voice to data of a photographed image have been performed. In one example, Patent Literature 1 discloses a technique based on the assumption that a voice signal generated during an appropriate continuous period including the time point of performing a photographing operation is recorded on a rotary recording medium together with a still image signal.

CITATION LIST

Patent Literature

Patent Literature 1: JP S61-081092A

DISCLOSURE OF INVENTION

Technical Problem

However, such attachment of voice to image data of a photographed picture is necessary to adopt a complicated method of accessing the image data of the photographed picture using a dedicated application and of attaching voice data to it manually.

Further, in a case where a device having no GPS function performs photographing, GPS information of a cooperating smartphone may be sometimes attached automatically. However, there is no function of simply attaching voice to a picture. In addition, although there is a function that can attach metadata associated with a picture as text information later, complicated processing is still necessary, which is not practical.

Thus, in the case of viewing a photographed picture later, it is difficult to find a photograph to be viewed in a short time. It is conceivable that a device automatically recognizes the situation at the time of photographing. However, there may be a case of being called by different names even in identical events, for example, sports day and athletic festival, or a case of being different in memory, granularity, and information despite using GPS information, for example, Kanagawa Prefecture, Kamakura City, and Tsurugaoka Hachiman-gu. This may be inferior to the case where a photographer himself performs the attachment.

Therefore, it is desirable to activate automatically a function associated with a picture to perform processing in a short time at the time of photographing.

Solution to Problem

According to the present disclosure, there is provided an information processing device including: a photographing information acquisition unit configured to acquire photographing information from another device, the photographing information being related to a photographing operation performed in the other device; and a function activation unit configured to activate a predetermined function among a plurality of functions related to an image obtained on the basis of the photographing operation, the activation being dependent on the acquisition of the photographing information.

Further, according to the present disclosure, there is provided a method of information processing, the method including: acquiring photographing information from another device, the photographing information being related to a photographing operation performed in the other device; and activating a predetermined function among a plurality of functions related to an image obtained on the basis of the photographing operation, the activation being dependent on the acquisition of the photographing information.

Further, according to the present disclosure, there is provided a program for causing a computer to function as: means for acquiring photographing information from another device, the photographing information being related to a photographing operation performed in the other device; and means for activating a predetermined function among a plurality of functions related to an image obtained on the basis of the photographing operation, the activation being dependent on the acquisition of the photographing information.

Advantageous Effects of Invention

As described above, according to the present disclosure, it is possible to activate automatically a function associated with a picture to perform processing in a short time at the time of photographing. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
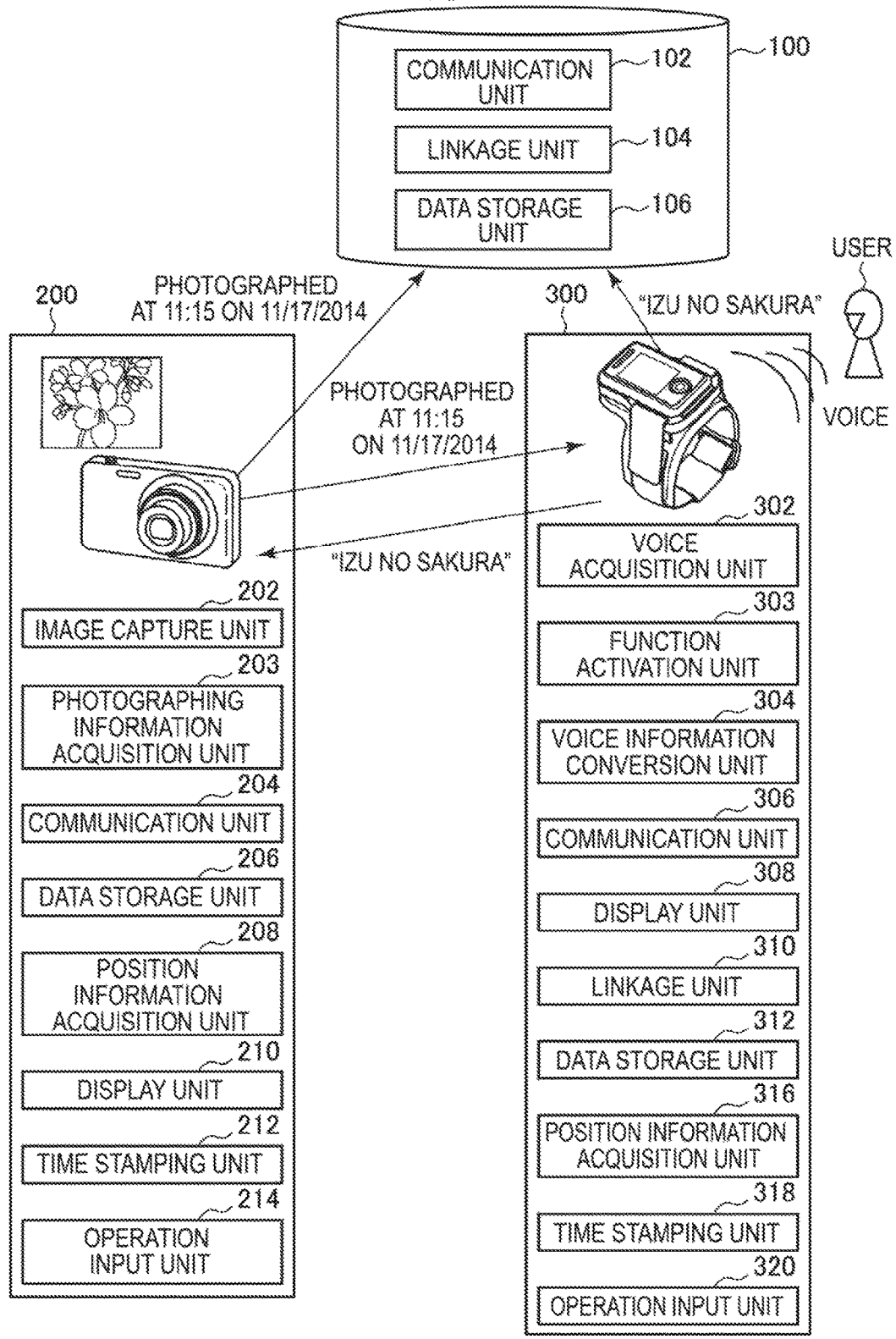
FIG. 1 is a schematic diagram illustrating a schematic configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. System configuration example
2. Cooperation operation in system
3. Processing procedure in system
1. System Configuration Example A schematic configuration of a system according to an embodiment of the present disclosure is described with reference to FIG. 1. As illustrated in FIG. 1, this system includes a server 100, an image capture device 200, and a response device 300. The server 100, the image capture device 200, and the response device 300 are connected to each other so that they can wirelessly communicate via a network or the like, and these devices cooperate with each other. Moreover, a method of wireless communication between cooperating devices is not limited to any particular one, and they may be connected through a communication system such as wireless LAN (Wi-Fi) or long-term evolution (LTE). Although FIG. 1 illustrates one image capture device 200 and one response device 300, a plurality of image capture devices 200 and a plurality of response devices 300 may be used. Moreover, cooperating devices can be registered in advance, and each target of the image capture device 200 and the response device 300 to cooperate with each other can be changed by allowing the response device 300 to have access to the image capture device 200 via a network. Each of the image capture device 200 and the response device 300 can acquire an identification ID of the communication opponent device and can communicate with only a cooperating device on the basis of the identification ID. In addition, the image capture device 200 and the response device 300 can cooperate with each other in normal condition. In addition, they may determine whether to cooperate with each other, depending on the types of device and application and the position of each device. The configuration allows the present embodiment to enhance easily the value added to the content by achieving cooperation between a plurality of devices. The details of this are described below.

The image capture device 200 is a device such as digital camera and smartphone. When the image capture device 200 photographs (records) "picture" or "moving image" depending on an operation of the user, the cooperating response device 300 (e.g., smartphone or wearable device) automatically activates its specific function. In one example, if the image capture device 200 photographs a picture, the response device 300 is notified of this event and activates its voice recording function. In addition, the response device 300 displays the photographed picture. The response device 300 allows the user to associate a spoken voice and text created by speech-to-text with the displayed picture on the spot, by speaking about the situation in relation to the picture. Thus, a keyword attached to the picture by the photographer's own voice makes it possible to find reliably a desired picture when the picture is viewed later. In addition, text data attached to the picture makes it possible to easily remind of the date and time the picture was photographed, the person who photographed the picture, and the situation in which the picture was photographed.

The image capture device 200 includes an image capture unit 202, a photographing information acquisition unit 203, a communication unit 204, a data storage unit 206, a position information acquisition unit 208, a display unit 210, a time stamping unit 212, and an operation input unit 214. The image capture unit 202 is composed of an image sensor for performing photoelectric conversion of a subject, an optical lens, and the like. Moreover, the term "photographing" as used in the present embodiment is equivalent to processing of recording image data, which is obtained by photoelectric conversion in the image sensor, in the storage. The image capture information acquisition unit 203 acquires photographing information when the user photographs an image of a subject. The photographing information includes information (event) that the photographing has been performed, photographed time, photographed state (e.g., continuous shooting, moving image, and photographing mode), and information on a subject (e.g., food and portrait (friend)). The communication unit 204 performs communication with the server 100 and the response device 300, performs exchange of information such as image data with the server 100 and the response device 300, and performs transmission and acquisition of information. The operation input unit 320 is composed of a touch sensor or the like, and inputs information by a user's operation. The image capture device 214 photographs an image of a subject depending on a user's operation and stores the photographed image data in the data storage unit 206. Moreover, the image capture device 200 may include a vibrator that notifies the user by vibration.

The response device 300 is a device that performs processing in response to the photographing performed by the image capture device 200. FIG. 1 illustrates a bracelet-type wearable device that is worn on the arm as the response device 300. This response device 300 is configured to activate its recording function when the image capture device 200 performs the photographing and to record the voice corresponding to the photographed image data. Moreover, the response device 300 may be a device such as smartphone or tablet terminal. In addition, the response device 300 may activate functions or applications other than the recording function when the image capture device 200 performs the photographing.

The response device 300 includes a microphone (voice acquisition unit) 302 that acquires a user's voice as voice information, a function activation unit 303, a voice information conversion unit 304 that converts the acquired voice information into text information, a communication unit 306, and a display unit 308. When the photographing information is received from the image capture device 200, the function activation unit 303 activates the voice acquisition unit 302. In addition, when the photographing information is received from the image capture device 200, the function activation unit 303 can activate applications other than the recording function. Moreover, although FIG. 1 illustrates that the response device 300 includes the display unit 308, the response device 300 does not necessarily include the display unit 308. Moreover, the voice information conversion unit 304 is not necessarily provided in the response device 300 but may be provided in a server on a cloud. In this case, the response device 300 transmits voice data to the server on the cloud, and then the server on the cloud converts it into text information and transmits the text information to the response device 300.

The communication unit 306 performs communication with the server 100 and the image capture device 200, performs exchange of information such as image data with the server 100 and the image capture device 200, and performs transmission and acquisition of information. The display unit 308 displays an image based on the image data acquired from the image capture device 200. An operation input unit 320 is composed of a touch sensor or the like, and receives information on an operation input by the user. In addition to the above configuration, the response device 300 includes a linkage unit 310, a data storage unit 312, a position information acquisition unit 316, and a time stamping unit 320. In addition, the response device 300 and the image capture device 200 may include a vibrator that notifies the user by vibration.

The server 100 includes a communication unit 102, a linkage unit 104, and a data storage unit 106. The communication unit 204 communicates with the image capture device 200 and the response device 300, and exchanges information such as image data with the image capture device 200 and the response device 300. The linkage unit 104 links the image data received from the image capture device 200 with the text information received from the response device 300. The data storage unit 106 stores a combination of the image data and the text data linked by the linkage unit 104.

Moreover, each of the components of the server 100, the image capture device 200, and the response device 300 illustrated in FIG. 1 is constituted by hardware (circuit), or a central processing unit (CPU) and program (software) for causing it to function. In this case, the program can be recorded in a memory (hard disk) provided in each device or in a recording medium connected to each device from outside.

2. Cooperation Operation in System

When the user photographs an image with the image capture device 200, the communication unit 204 sends image data obtained by the photographing to both the server 100 and the response device 300. In the example of FIG. 1, the image data of "IZU NO SAKURA" photographed at 11:15 on Nov. 17, 2014 is sent to both the server 100 and the response device 300. In addition, when the user photographs an image with the image capture device 200, the image capture device 200 transmits the photographing information acquired by the photographing information acquisition unit 203 to the response device 300. Moreover, the photographing information may be included in the image data sent from the image capture device 200 to the response device 300. The response device 300, when receiving the photographing information, notifies the user of the photographing information depending on the state of the image capture device 200, for example, using display on the display unit 308, lighting of an LED, and vibration. The image data to be sent from the image capture device 200 to the response device 300 is sent as image data reduced depending on the size of a screen of the display unit 308 of the response device 300.

The response device 300, which receives the image capture information, starts the voice recording by causing the function activation unit 303 to activate the function of the microphone 302 on the basis of the information on an event that the photographing is performed. Then, when the user speaks to the response device 300, the user's voice is recorded. In the response device 300, voice recognition of the recorded voice is performed, and the voice information is converted into text information by the voice information conversion unit 304. The text information is sent to the server 100 via the communication unit 306. The server 100 links the image data sent from the image capture device 200 with the text information sent from the response device 300, and then stores the linked data. In addition, the response device 300 transmits the text information as well as the voice information to the server 100. The server 100 links the image data sent from the image capture device 200 with the text information and the voice information (or one of them) sent from the response device 300, and then stores the linked data. This makes it possible for a user (the user of the response device 300) different from the user who performs photographing (the user of the image capture device 200) to attach a comment to the image data.

The recording is started from the point of time when voice recognition can be performed before and after the timing of receiving the photographing information. In one example, the recording can be started when the volume is equal to or higher than a predetermined value. The recording can be terminated at the point of time when a voice is no longer recognized for a certain period. In one example, when the volume falls below a predetermined value, the recording can be terminated.

In the example of FIG. 1, when the user of the response device 300 speaks "IZU NO SAKURA", the voice is converted into text information "IZU NO SAKURA" and this text information is transmitted to the server 100. Moreover, in the case where there are a plurality of recording parameters (e.g., sound quality), the response device 300 may switch the parameter into another depending on the photographing information sent from the image capture device 200.

The server 200 links the image data received from the image capture device 200 with the text information received from the response device 300 through the linkage unit 102, and stores the linked data in the data storage unit 106. This allows the user, when accessing the server 100 later to acquire the stored image data, to read the image data in a state where the linked text information "IZU NO SAKURA" is attached. Thus, it is possible to recognize simultaneously the image data and a vocal comment attached to the image data. In addition, in the case where only a specific picture is notified to the response device 300 and the user of the response device 300 wants to view an image other than the specific picture, an instruction to transmit it to the server 100 may be given to the image capture device 200.

Further, the display unit 308 of the response device 300 can display the acquired image data. In this case, the user of the response device 300 can record a voice after visually recognizing the displayed image data. In addition, the response device 300 may cause the linkage unit 310 to link the text information obtained by converting the voice and the voice information with the image data, and may store the linked data in the data storage unit 312, which is similar to the server 100.

Moreover, as described above, the response device 300 does not necessarily include the display unit 308. In this case, the image data is not necessarily sent from the image capture device 200 to the response device 300. The response device 300 performs recording in response to reception of the photographing information and transmits the text information to the server 100. The server 100 links the text information received from the response device 300 with the image data received from the image capture device 200, and stores the linked data.

Further, the response device 300 sends, to the image capture device 200, information indicating the state of the response device 300 (e.g., information indicating whether cooperation is possible, whether it is a bracelet-type wearable device or a tablet terminal, remaining quantity of battery, communication state, position information, remaining capacity of storage (whether recording is possible), and the distance to another response device 300 in case of a plurality of response devices 300), the timing for notifying the photographing information (e.g., the number of times may be higher or is preferable to being lower), information on a person (person's name) who holds the terminal, and feedback information on a result obtained by executing the function (e.g., information indicating that recording is performed, information indicating that a comment is attached, and recorded contents). These pieces of information are received by the image capture device 200 via the communication unit 204, and are displayed on the display unit 210. In addition, in the case where the user of the response device 300 inputs "Like" to the picture, information indicating this event is sent to the image capture device 200. The image capture device 200 reports such feedback to the user through display, vibration, sound, and LED.

The response device 300, when receiving the photographing information, can activate a predetermined application. In one example, when the user of the image capture device 200 photographs a food picture, the response device 300 displays a thumbnail of the image data received from the image capture device 200 on the display unit 308. At the same time, the response device 300 causes the function activation unit 303 to activate the application of social network service (SNS) used typically by the user. This makes it possible for the user to post the food picture to the SNS using the response device 300. In addition, for example, when the user of the image capture device 200 photographs a food picture, an application that performs processing such as photo edition may be activated.

The image capture device 200 notifies the response device 300 of the photographing information in normal condition every time the photographing is terminated. On the other hand, in consideration that the user photographs a plurality of images, there may be a case where the user continuously photographs a plurality of images. In this case, if identical pictures are photographed, immediate transmission of the photographing information (and image data) from the image capture device 200 to the response device 300 is not performed. The image capture device 200 may pause a moment after the continuous photographing is terminated and then may transmit the photographing information (and image data) to activate the recording function and other applications. In other words, the activation of the recording function or other application may be dependent on the elapsed time after the photographing by continuous shooting is terminated. This makes it possible to record or post all the comments related to the plurality of pictures when the recording function or other application is activated. In addition, in this case, the transmission of the photographing information to the response device 300 is not necessarily based on the elapsed time, but the transmission may be performed at the point of time when the power of the image capture device 200 is turned off (immediately before turning off). In addition, in the case where the photographing by continuous shooting is performed, the photographing information may be transmitted to the response device 300 at the time when the continuous shooting is terminated. For the mode switching, the photographing information may be transmitted at the time when the continuous shooting mode is switched to the normal mode. Moreover, in the case of photographing a plurality of images, the voice recorded over a period of photographing the plurality of images may be linked to the image data.

Further, it is also possible to change an application to be activated on the side of the response device 300 depending on the photographed image. In one example, an application of SNS is activated for a food picture, and photo edition (processing) application is activated for a landscape picture. The function activation unit 303 changes an application to be activated on the basis of the photographing information or the image data received via the communication unit 306. In addition, the function activation unit 303 can also activate the most suitable application on the basis of the user's past usage history of the application. In this case, the past usage histories are sequentially stored in the data storage unit 312.

Furthermore, in the case where there are a plurality of response devices 300, the function activation unit 303 selects a device to execute a function from among the plurality of response devices 300. In this case, a function corresponding to only the selected response device 300 is activated. The function activation unit 303 can select the response device 300 on the basis of the photographing information. In addition, the function activation unit 303 can select the response device 300 on the basis of the information related to the plurality of response devices 300 (e.g., a parameter indicative of specifications, or capacity (e.g., memory capacity)). Assuming that the plurality of response devices 300 communicate using Wi-Fi, LTE, or the like, one of the plurality of response devices 300 serves as a master, and the function activation unit 303 of the response device 300 serving as a master can select a device for the function execution. In this case, the response device 300 serving as a slave transmits information such as a parameter indicative of specifications to the response device 300 serving as a master in advance.

Further, in the case where there are a plurality of candidates of application to be activated, a plurality of candidates may be displayed and selected by the user.

Further, it is also possible to determine an application to be activated on the basis of a plurality of pictures. In one example, if three of five pictures are food pictures, an application of restaurant introduction site may be activated. Likewise, if three of five pictures are portrait pictures, the priority of an application to cooperate, such as activation of SNS application, when a portrait picture is recognized, may be set to be higher.

Further, it is also possible to determine an application to be activated depending on the photographing mode of the image capture device 200. In one example, if the photographing is performed in a food photographing mode, an application of restaurant introduction site may be activated.

Further, the system shown in FIG. 1 can be applied to watching children for indoor and outdoor use. In the case of indoor use, the image capture device 200 and the response device 300 may be connected using a Wi-Fi environment. In one example, if a child is wearing a small image capture device 200 and the child's parent holds the response device 300, image data obtained by photographing the child is sent to the response device 300 and the child's parent can recognize the place where the child exists from the image, thereby watching the child. In addition, when the recording function is activated upon reception of the photographing information by the response device 300, the child's parent can attach a comment to the image photographed by the child.

In one example, in the case of indoor use, the child's parent can view what the child is doing while doing housework, or can record a comment on the photographed picture while watching the state of the child in the living room. In the case where there are children, the notification pattern may be changed depending on the image capture device 200 carried by each child, or the display method in the case where the response device 300 receives the notification may be changed.

Further, in the case of outdoor use, the connection between the image capture device 200 and the response device 300 can be set to be optimal, for example, the connection is established using Wi-Fi between the image capture device 200 and the response device 300 which are a short distance apart, and using LTE between them which are further away. Thus, the communication unit 204 and the communication unit 306 can communicate using a plurality of communication schemes, and the communication scheme can be changed depending on the distance. The child's parent who holds the response device 300 can attach a vocal comment to the picture while viewing the state of the child, and can view any interesting picture in response to the notification from the imaging device 200 via the server 100.

Further, the function to be activated by the response device 300 receiving photographing information may be changed depending on the distance between the image capture device 200 and the response device 300. The image capture device 200 can acquire the position information through the position information acquisition unit 208. In addition, the response device 300 can acquire the position information through the position information acquisition unit 316. The position information of the image capture device 200 is sent to the response device 300. In addition, the position information of the response device 300 is sent to the image capture device 200. The function activation unit 303 changes the activation function depending on the distance between the image capture device 200 and the response device 300, obtained from the position information of the image capture device 200 and the position information of the response device 300. In one example, in the case where the user of the image capture device 200 is a child and the user of the response device 300 is the child's parent, if the distance between the image capture device 200 and the response device 300 is short and the child and the child's parent are together, the recording function is activated. However, in the case where the parent and the child are apart from each other, for example, the child gets lost, the application (e.g., a location search application) related to the picture may be activated.

Further, in the case where the user holds a plurality of different response devices 300, the photographing information is transmitted depending on the distance from them to the image capture device 200. In one example, in the case where the user holds two devices, that is, a bracelet-type wearable device and a smartphone, as the response device 300, the user of the response device 300, which is located near the user who performs photographing, knows what the user who performs photographing is photographing. Thus, the photographing information is sent to the bracelet-type wearable device. In this case, the wearable device does not necessarily display an image. On the other hand, when the user of the response device 300 and the user who performs photographing are away from each other by more than a fixed distance, the photographing information is sent to the smartphone together with the image data (thumbnail). In this manner, the communication unit 204 of the image capture device 200 can select a target response device 300 to which the information is sent, depending on the distance between the image capture device 200 and the response device 300.

Further, in the case where the user holds, as the response device 300, two devices, that is, a bracelet-type wearable device and a tablet terminal, the image capture device 200 sends information to each of the response devices 300 depending on the distance between them. In one example, in the case where the user is in front of the tablet terminal in the house and the distance between the bracelet-type wearable device worn by the user and the tablet terminal is short, the picture photographed by the child is transmitted to the tablet terminal and is displayed. On the other hand, in the case where the user is in another room where the tablet terminal is not present and the distance between the bracelet-type wearable device and the tablet terminal is long, the picture is transmitted to the bracelet-type wearable device worn on the body by the user and is displayed. As described above, the response device 300 sends information indicating the distance to another response device 300 to the image capture device 200. The communication unit 204 of the image capture device 200 can select a response device 300 to send information depending on the respective distance between the image capture device 200 and the plurality of response devices 300.

Likewise, in the case where a smartphone is in the pocket and a bracelet-type wearable device is worn, the distance between the bracelet-type wearable device worn by the user and the smartphone is short, and thus the photographing information is sent to the bracelet-type wearable device. However, if the bracelet-type wearable device and the tablet terminal can communicate with each other using NFC or the like, information on the same picture as the bracelet-type wearable device is notified to the side of the smartphone, and an image is displayed on the smartphone. In the case where the communication state is unsatisfactory or the battery is low, the information on the picture may be sent to other devices.

In the case where there are a plurality of response devices 300, the image data or the photographing information may be transmitted depending on the type and function of the response device 300. If the plurality of response devices 300 including a bracelet-type wearable device and the image capture device 200 cooperate with each other, the photographing information is transmitted preferentially to the bracelet-type wearable device. In addition, the photographing information may be transmitted depending on the enabled function of the response device 300, such as transmission of the photographing information to the response device 300 capable of recording a satisfactory voice.

Further, the photographing information may be sent to the plurality of responding devices 300 at the same time. In one example, the image data and the photographing information are sent from the image capture device 200 held by a child to both the bracelet-type wearable device and the tablet terminal which are the response devices 300. When the tablet terminal displays a picture of a painting photographed by a child, it is thought to be a good picture and a way of use of making a comment "Flower is well painted" spoken to the bracelet-type wearable device whose recording function is activated is conceivable.

Further, the notification may be given to different response devices 300 depending on a target to be photographed. In one example, for a food picture, the photographing information can be sent to the smartphone so that the picture may be attached to an application of the SNS. For a flower picture, the photographing information can be sent to the bracelet-type wearable device so that a comment may be attached by the recording function.

Further, the image capture device 200 and the response device 300 may be held by a plurality of users. In this case, the image photographed by the image capture device 200 is transmitted to each of the plurality of response devices 300, and the function of each of the response devices 300 is activated. This makes it possible for the user of each response device 300 to record the user's impressions for the transmitted image by voice. In this case, the users have the individual response devices 300, and thus information (e.g., ID of the response device 300 or name of the user) indicating who adds the comment to the image is displayed in association with the image.

Further, the image capture device 200 may be equipped with the recording function in a similar way to the response device 300. In this case, if children hold the image capture device 200 (equipped with the recording function), when a child photographs another child, photographing information is transmitted to the image capture device 200 held by a child in the surroundings, and thus the recording function is enabled and the voice is recorded. In addition, when a child photographs another child, the image capture device 200 held by the other child may perform photographing in synchronization with the child being photographed, or if a child raises a loud voice that seems to be enjoyable, a camera held by a child in the surroundings may automatically perform photographing. The notification of an ID of a child who raises a loud voice makes it possible to analyze the photographed image and to perform the linkage if the child is in it.

In the case where a plurality of pictures are transmitted from the image capture device 200 to the response device 300, as long as a picture is displayed on the screen of the response device 300, a comment is recorded on the picture. If the display is switched to another picture, a comment is recorded on a newly displayed picture.

Figure 2:
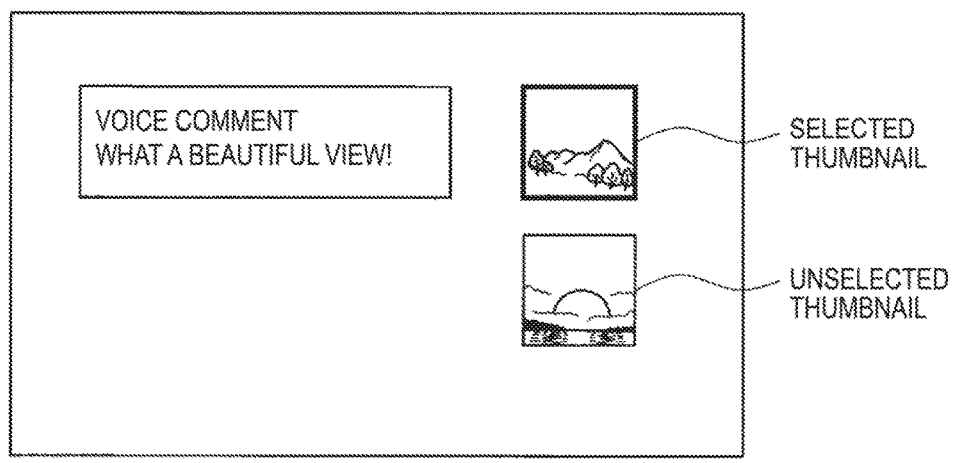
FIG. 2 is a schematic diagram illustrating, in selecting a particular thumbnail among a plurality of thumbnails displayed on a display screen of a response device, how a comment on a selected picture is recorded.

Further, FIG. 2 is a schematic diagram illustrating an example in which data of photographed image and text information given by recording are displayed together on the display unit 308 in the case where the response device 300 is a tablet terminal. As illustrated in FIG. 2, thumbnails of a plurality of pictures photographed and received are displayed on the display screen of the response device 300, and when a particular thumbnail is selected (tapped), recording of a comment on the selected picture may be performed. In the example shown in FIG. 2, a small-sized thumbnail to which a comment is attached is displayed in the horizontal direction. The ID or face picture of the user who makes a comment may be displayed together with the comment in association with each other.

Further, the image capture device 200 may be a glasses-type wearable device. In this case, a sensor can control the photographing timing. In one example, when a marathon runner wears a glasses-type wearable device and a sensor provided in the shoes detects a distance of 5 km during marathon, the glasses-type image capture device 200 photographs a picture. In addition, the marathon runner wears a bracelet-type wearable device serving as the response device 300 on the arm. When the image capture device 200 performs photographing, the recording function of the response device 300 is enabled, and the feeling of the marathon runner at that time can be recorded.

An example of a device to cooperate with each other in the system of the present embodiment includes a device of family members and other people as well as a device worn on the body. In one example, its own single-lens reflex camera (the image capture device 200) and a bracelet (the response device 300) cooperate with each other, and a voice can be attached without any modification during photographing. In addition, the camera (the image capture device 200) held by the child cooperate with its own bracelet (the response device 300) (of the parent) so that the reception of the photographing information may be reported to the user by making the bracelet shake. Thus, a use of allowing a child's parent to notice the child photographing a picture and to explain the picture by voice about the situation that the child photographs the interesting thing while looking at the child can be envisaged.

Further, in the state in which a child's parent puts a bow tie-type recording device or the like serving as a small-sized response device 300 on the child's body and performs photographing with the image capture device 200, a use of recording the child's voice can be envisaged. In this case, it is possible to start the recording by the response device 300 before photographing and to record the child's voice before photographing a picture by sending the photographing information from the image capture device 200 to the response device 300 at the time when the parent touches a shutter release button to determine the composition.

Moreover, in the example described above, the response device 300 receives the photographing information and then the recording function is activated. However, on the side of the response device 300, recording can be performed continuously from before the photographing and a time stamp can be added to each of the image data photographed by the image capture device 200 and the text information created by the response device 300. Then, the linkage unit 104 and the linkage unit 310 can perform linkage between them on the basis of the time stamp. Thus, the time stamping unit 212 of the image capture device 200 adds a time stamp to the image data, and a time stamping unit 318 of the response device 300 adds a time stamp to the text information (or voice information). With such a configuration, it is possible to link the image data with text information obtained by recording the situation before the photographing as well as the situation after the photographing.

In the case of continuous shooting, the notification of the photographing may be transmitted to the response device 300 only when the first one image is photographed. In this case, it is also possible to link a voice with all pictures by recording.

In the case where the image capture device 200 photographs a moving image, recording can be performed from the start of photographing, and the recording is synchronized in time with the moving image. The content recorded in a particular scene is linked with that scene. If an explanation is added to a normal moving image, the moving image fails to be enjoyed without explanation. However, by sharing roles, that is, a person performs photographing and another person records a voice, it is possible to record a voice separately without adding a voice to the moving image itself and to associate the voice with the moving image.

Further, in the case of a device that records position information, pressing the button allows a voice recording function to be activated and allows what you saw, what you want to do, or the like to be recorded. In addition, it is also possible to synchronize with various states such as sending mail, playing music, or the like.

Moreover, the voice recording when the image capture device 200 performs photographing is not necessarily performed. Thus, in the case where the user holding the response device 300 does not speak anything at the time of recording, the recorded file and the image data are not linked. However, even in this case, there is a possibility of recognizing erroneously that the user actually speaks but do not speak anything, and thus it is desirable to store the voice for a certain period on the side of the response device 300 and to take measures such as manual linkage if necessary. When whether the user speaks during recording is determined, the response device 300 determines whether the sound inputted to the microphone is noise or voice by using a parameter of voice likelihood. The voice can be recorded by using a proximity sensor for determining that the response device 300 approaches the face (mouth), a pressure sensor for determining that the response device 300 touches a part of the body, a temperature sensor, or the like.

Further, in the case where the response device 300 that records voice in cooperation with the image capture device 200 is a wearable device, this response device may be a neck strap, a watch, a ring, a necklace, or the like, in addition to the bracelet. In addition, it may be a device such as a smartphone other than wearable devices.

3. Processing Procedure in System

Figure 3:
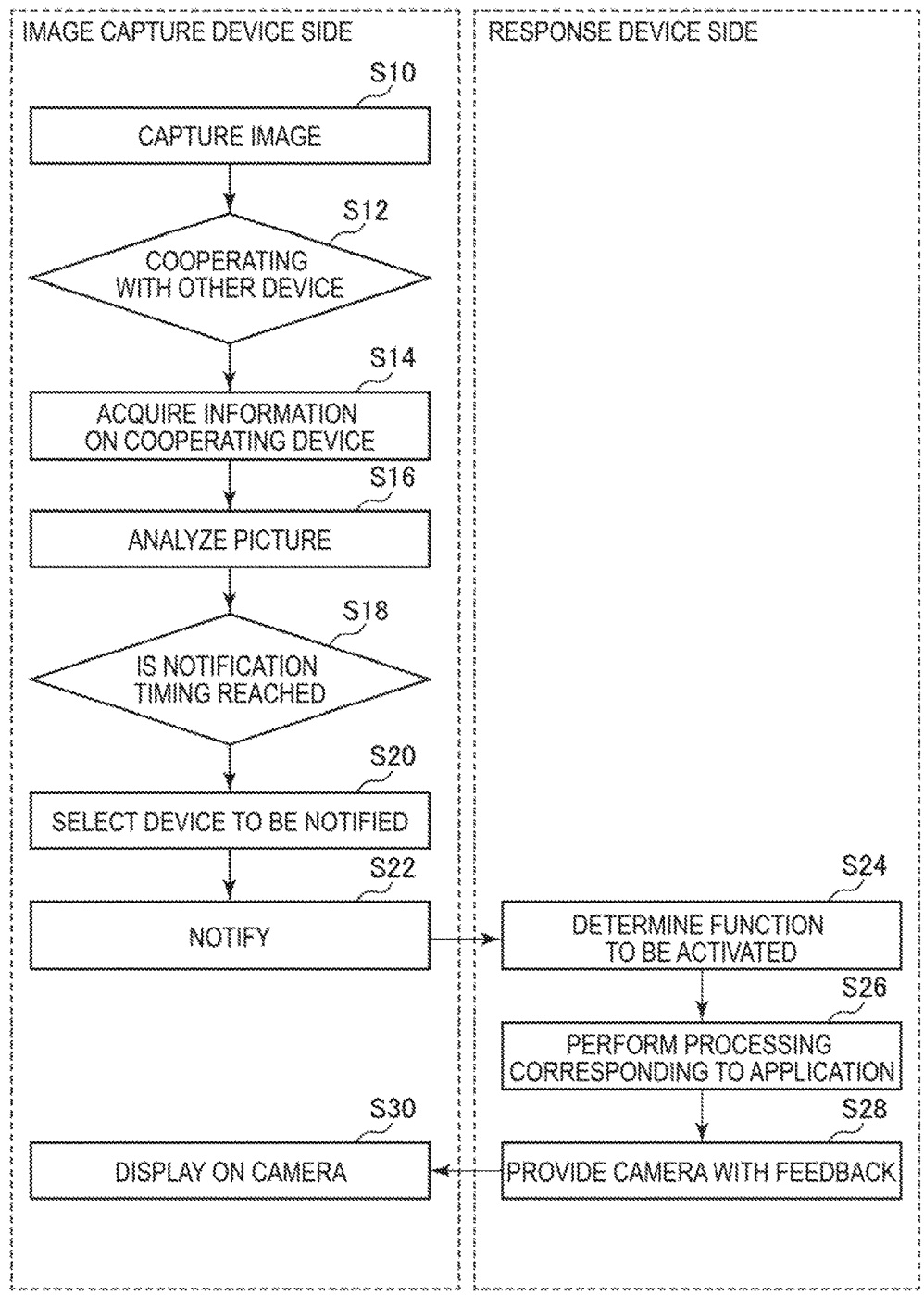
FIG. 3 is a flowchart showing processing performed in the system of the present embodiment.

The processing performed in the system of the present embodiment is described with reference to the flowchart of FIG. 3. In step S10, the image capture device 200 performs photographing. Then, in step S12, the image capture device 200 checks whether to be cooperating with the response device 300 through communication. Then, in step S14, the image capture device 200 acquires information on the response device 300 cooperating with the image capture device 200.

Then, in step S16, image data of the photographed picture is analyzed and photographing information is acquired. In this step, what is analyzed is whether it is in continuous shooting mode, whether a plurality of pictures of the same subject are photographed, what the subject is (food or friends), or the like. Then, in step S18, determination of whether notification timing is reached is performed. Then, in step S20, a response device 200 to be notified is selected. In this case, the selection is performed by making the comprehensive determination depending on the state of content, user, and device. Then, in step S22, the photographing information is notified to the response device 200 selected in step S20. At the time of notification, image data is also transmitted.

The response device 300, when receiving the notification from the image capture device 200, in step S24, determines a function (application) to be activated on the basis of a subject, content, or the like, and activates the function (application). Then, in step S26, processing corresponding to the activated function is performed. Then, in step S28, feedback to the image capture device 200 is performed. In step S30, the image capture device 200 displays information fed back from the response device 300.

Figure 4:
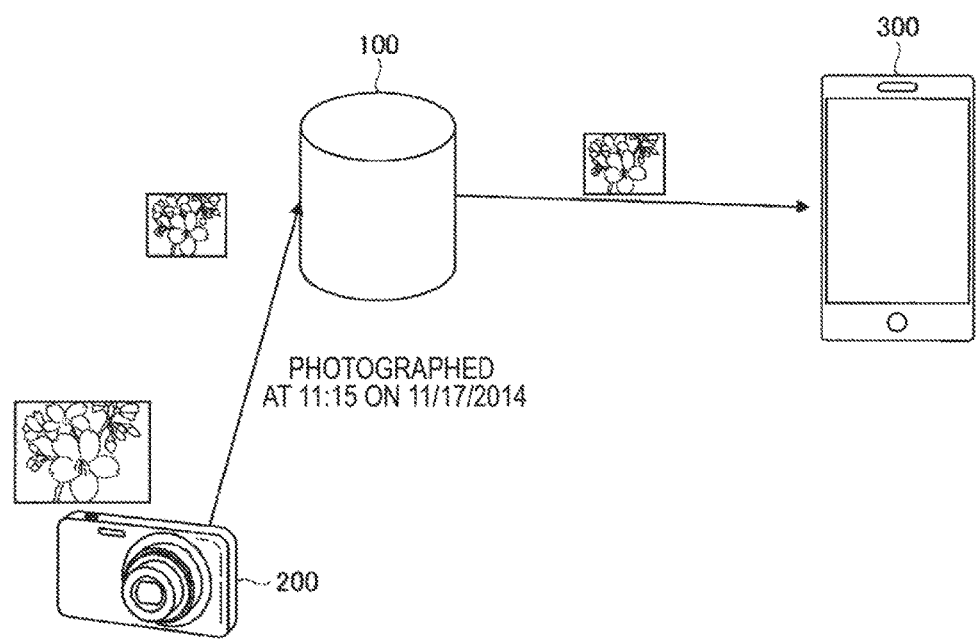
FIG. 4 is a schematic diagram illustrating a state in which an image capture device and a response device are connected via a server.

As illustrated in FIG. 1, in the present embodiment, the server 100, the image capture device 200, and the response device 300 are connected directly to each other. On the other hand, in the case where the distance between the image capture device 200 and the response device 300 is long, the image capture device 200 and the response device 300 may be connected via the server 100, as illustrated in FIG. 4. In this case, the image photographed by the image capture device 200 is uploaded to the server 100, and the photographing information and the image are sent to the response device 300 via the server 100.

As described above, the present embodiment creates information that can enhance the value added to content by combining picture, voice, or the like. In this case, automatic activation of the function at the timing of generating the content makes it possible for the user to combine easily the contents. In addition, the timing to activate the function and the function to be activated are changed depending on the situation, and thus it is possible to greatly increase the user's convenience.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a photographing information acquisition unit configured to acquire photographing information from another device, the photographing information being related to a photographing operation performed in the other device; and a function activation unit configured to activate a predetermined function among a plurality of functions related to an image obtained on the basis of the photographing operation, the activation being dependent on the acquisition of the photographing information.

(2)

The information processing device according to (1), wherein the function activation unit selects the predetermined function from among the functions on the basis of the photographing information.

(3)

The information processing device according to (1), wherein the function activation unit selects a device to execute the function from among a plurality of device.

(4)

The information processing device according to (1), wherein the function is a function of recording a voice acquired at a timing of performing photographing corresponding to the photographing information.

(5)

The information processing device according to (1), wherein the function is a function of processing the photographed image.

(6)

The information processing device according to (1), wherein the function is a function of transmitting the image via a network in association with other information.

(7)

The information processing device according to (1), including:

an image acquisition unit configured to acquire the image.

(8)

The information processing device according to (7), wherein the function is a function of recording a voice uttered by a user with respect to photographing corresponding to the photographing information, and the information processing device includes a linkage unit configured to link the image with information obtained by the recording.

(9)

The information processing device according to (8), including:

a time stamping unit configured to add a time stamp to the information obtained by the recording, wherein the linkage unit performs linkage on the basis of a time stamp added to image data by the other device and a time stamp added to the information obtained by the recording.

(10)

The information processing device according to (1), wherein the photographing information acquisition unit acquires the photographing information at a timing of termination of continuous shooting in a case of performing photographing by the other device in continuous shooting.

(11)
The information processing device according to (1), wherein the photographing information acquisition unit acquires the photographing information at a timing of switching by the other device from continuous shooting mode to normal mode in a case of performing photographing by the other device in continuous shooting.

(12)
The information processing device according to (1), wherein the photographing information acquisition unit acquires the photographing information at a timing of turning off power of the other device.

(13)
The information processing device according to (4), further including:
a transmitter configured to transmit information obtained by the recording to a server having photographing-related image data.

(14)
The information processing device according to (1), wherein the function activation unit changes a function to be activated depending on a distance to the other device.

(15)
The information processing device according to (1), wherein the photographing information is transmitted from the other device depending on a distance to the other device.

(16)
The information processing device according to (1), wherein the photographing information is transmitted from the other device depending on a distance to another information processing device having an identical function.

(17)
The information processing device according to (1), wherein the function activation unit changes a function to be activated on the basis of the photographing information.

(18)
A method of information processing, the method including:
acquiring photographing information from another device, the photographing information being related to a photographing operation performed in the other device; and
activating a predetermined function among a plurality of functions related to an image obtained on the basis of the photographing operation, the activation being dependent on the acquisition of the photographing information.

(19)
A program for causing a computer to function as:
means for acquiring photographing information from another device, the photographing information being related to a photographing operation performed in the other device; and
means for activating a predetermined function among a plurality of functions related to an image obtained on the basis of the photographing operation, the activation being dependent on the acquisition of the photographing information.

REFERENCE SIGNS LIST 100 server
200 image capture device
300 response device
303 function activation unit
306 communication unit
308 display unit
310 linkage unit
318 time stamping unit

The invention claimed is:

1. A first information processing device, comprising:
a communication unit configured to communicate with a first device to acquire photographing information from the first device,
wherein the photographing information corresponds to a photographing operation performed by the first device; and
a function activation unit configured to:
activate a determined function among a plurality of functions related to an image obtained based on the photographing operation,
wherein the determined function is activated based on the acquisition of the photographing information from the first device; and
change the activated determined function based on the photographing information.

2. The first information processing device according to claim 1, wherein the function activation unit is further configured to select the determined function from the plurality of functions based on the photographing information.

3. The first information processing device according to claim 1, wherein the function activation unit is further configured to select a second device from a plurality of devices to execute the determined function.

4. The first information processing device according to claim 1, wherein the determined function is a function to record a voice acquired at a time the photographing operation corresponding to the photographing information is performed.

5. The first information processing device according to claim 1, wherein the determined function is a function to process the image obtained based on the photographing operation.

6. The first information processing device according to claim 1, wherein the determined function is a function to transmit the image via a network in association with specific information.

7. The first information processing device according to claim 1, further comprising:
an image acquisition unit configured to acquire the image.

8. The first information processing device according to claim 7, wherein
the determined function is a function to record a user voice uttered with respect to the photographing operation, and
the first information processing device further includes a linkage unit configured to link the image with the recorded user voice.

9. The first information processing device according to claim 8, further comprising
a time stamping unit configured to add a first time stamp to the recorded user voice,
wherein the linkage unit is further configured to link the image with the recorded user voice based on a second time stamp added to the image by the first device and the first time stamp added to the recorded user voice.

10. The first information processing device according to claim 1, wherein the communication unit is further configured to acquire the photographing information at a time of termination of a continuous shooting mode based on the photographing operation performed by the first device in the continuous shooting mode.

11. The first information processing device according to claim 1, wherein the communication unit is further configured to acquire the photographing information at a time the first device is switched from a continuous shooting mode to a normal mode based on the photographing operation performed by the first device in the continuous shooting mode.

12. The first information processing device according to claim 1, wherein the communication unit is further configured to acquire the photographing information at a time power of the first device is turned off.

13. The first information processing device according to claim 4, further comprising
a transmitter configured to transmit the recorded voice to a server having photographing-related image data.

14. The first information processing device according to claim 1, wherein the function activation unit is further configured to change the activated determined function based on a distance of the first information processing device to the first device.

15. The first information processing device according to claim 1, wherein the communication unit is further configured to acquire the photographing information from the first device based on a distance of the first information processing device to the first device.

16. The first information processing device according to claim 1, wherein the photographing information is transmitted from the first device based on a distance of the first device to a second information processing device having a function identical to that of the first information processing device.

17. A method of information processing, the method comprising:
in an information processing device:
acquiring photographing information from a device, the photographing information being related to a photographing operation performed by the device;
activating a determined function among a plurality of functions related to an image obtained based on the photographing operation,
wherein the determined function is activated based on the acquisition of the photographing information from the device; and
changing the activated determined function based on the photographing information.

18. A non-transitory computer-readable medium having stored thereon, computer-executable instructions which, when executed by a computer, cause the computer to execute operations, the operations comprising:
acquiring photographing information from a device,
the photographing information being related to a photographing operation performed by the device;
activating a determined function among a plurality of functions related to an image obtained based on the photographing operation,
wherein the determined function is activated based on the acquisition of the photographing information from the device; and
changing the activated determined function based on the photographing information.

19. An information processing device, comprising:
a communication unit configured to communicate with a device to acquire photographing information from the device,
wherein the photographing information is related to a photographing operation performed by the device;
a function activation unit configured to:
activate a determined function among a plurality of functions related to an image obtained based on the photographing operation,
wherein the determined function is activated based on the acquisition of the photographing information from the device, and
wherein the determined function is a function to record a voice acquired at a time the photographing operation corresponding to the photographing information is performed; and
a transmitter configured to transmit the recorded voice to a server having photographing-related image data.

20. An information processing device, comprising:
a communication unit configured to communicate with a device to acquire an image and photographing information from the device,
wherein the image is obtained based on a photographing operation performed by the device and the photographing information is related to the photographing operation;
a function activation unit configured to:
activate a determined function among a plurality of functions related to the image,
wherein the determined function is activated based on the acquisition of the photographing information from the device, and
wherein the determined function is a function to record a user voice uttered with respect to the photographing operation;
a linkage unit configured to link the image with the recorded user voice; and
a time stamping unit configured to add a first time stamp to the recorded user voice,
wherein the linkage unit is further configured to link the image with the recorded user voice based on a second time stamp added to the image by the device and the first time stamp added to the recorded user voice.

* * * * *